United States Patent
Hurd (10) Patent No.: US 11,623,576 B2
(45) Date of Patent: Apr. 11, 2023

(54) METHOD AND SYSTEM FOR SECURING AN OBJECT

(71) Applicant: HONDA MOTOR CO., LTD., Tokyo (JP)

(72) Inventor: Carter Jeffrey Hurd, Southfield, MI (US)

(73) Assignee: HONDA MOTOR CO., LTD., Tokyo (JP)

( * ) Notice: Subject to any disclaimer, the term of this patent is extended or adjusted under 35 U.S.C. 154(b) by 726 days.

(21) Appl. No.: 16/565,240

(22) Filed: Sep. 9, 2019

(65) Prior Publication Data

US 2021/0070230 A1   Mar. 11, 2021

(51) Int. Cl.
| | |
|---|---|
| B60R 22/00 | (2006.01) |
| B60R 7/08 | (2006.01) |
| B60R 7/02 | (2006.01) |
| G06F 7/00 | (2006.01) |
| G06F 17/00 | (2019.01) |

(52) U.S. Cl.
CPC .............. *B60R 7/08* (2013.01); *B60R 7/02* (2013.01); *G06F 7/00* (2013.01); *G06F 17/00* (2013.01)

(58) Field of Classification Search
CPC ..... B60R 7/08; B60R 7/02; G06F 7/00; G06F 17/00
See application file for complete search history.

(56) References Cited

U.S. PATENT DOCUMENTS

| 6,843,458 B1 | 1/2005 | Robinson et al. |
| 9,358,930 B1 | 6/2016 | Sic |
| 2019/0217645 A1* | 7/2019 | Campbell ................ B41J 3/543 |

FOREIGN PATENT DOCUMENTS

| EP | 2251127 B1 | 4/2015 |
| JP | S63216109 A * | 9/1988 |
| JP | 2002-261498 A | 9/2002 |
| KR | 10-2005-0101449 A | 10/2005 |

* cited by examiner

*Primary Examiner* — Adam M Alharbi
(74) *Attorney, Agent, or Firm* — ArentFox Schiff LLP (57) ABSTRACT

Aspects of the present disclosure include methods, apparatus, and computer readable medium for securing an object including the steps of determining, dynamically, a first region on a surface, wherein the first region is at least partially covered by the object, identifying a second region different from the first region, and extending, through the surface, one or more securing devices in the second region to secure the object.

22 Claims, 8 Drawing Sheets

METHOD AND SYSTEM FOR SECURING AN OBJECT

TECHNICAL FIELD

The present disclosure relates to methods and systems for securing an object, such as a piece of luggage, in a vehicle.

BACKGROUND

Drivers and passengers in vehicles may utilize the storage compartments of the vehicles, such as trunks, to transport objects, such as luggage, groceries, and golf bags. As the vehicles move through different terrains, the objects may move randomly within the storage compartments. Certain objects may be fragile (e.g., eggs, fruit, golf clubs, view finders, electronics, etc.), and the movements may cause damage to the objects and/or contents of the objects. While conventional devices (e.g., nettings, hooks, or boxes) may be used, they may not be sufficiently versatile in securing various objects having different shapes and sizes. Therefore, improvements in securing objects may be desirable.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

Aspects of the present disclosure include methods for securing an object including the steps of determining, dynamically, a first region on a surface, wherein the first region is at least partially covered by the object, identifying a second region different from the first region, and extending, through the surface, one or more securing devices in the second region to secure the object.

Aspects of the present disclosure include a vehicle having a storage compartment including a surface and one or more securing devices configured to extend through the surface, one or more detectors configured to detect an object on the surface of the storage compartment, and a controller including: a memory, one or more processors operatively connected to the memory, the one or more processors being configured to: determine, dynamically, a first region on the surface, wherein the first region is at least partially covered by the object, identify a second region different from the first region, and cause the one or more securing devices in the second region to extend to secure the object.

Aspects of the present disclosure include a non-transitory computer readable medium having instructions stored therein that, when executed by one or more processors of a server, cause the one or more processors to perform the steps of determine, dynamically, a first region on the surface, wherein the first region is at least partially covered by an object, identify a second region different from the first region, and cause one or more securing devices in the second region to extend to secure the object.

Aspects of the present disclosure include an apparatus for securing an object including means for determining, dynamically, a first region on a surface, wherein the first region is at least partially covered by the object, means for identifying a second region different from the first region, and means for extending, through the surface, one or more securing devices in the second region to secure the object

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein.

The term "bus," as used herein, can refer to an interconnected architecture that is operably connected to transfer data between computer components within a singular or multiple systems. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Local Interconnect Network (LIN), among others.

The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

The term "operable connection," as used herein, can include a connection by which entities are "operably connected", is one in which signals, physical communications, and/or logical communications can be sent and/or received. An operable connection can include a physical interface, a data interface and/or an electrical interface.

The term "vehicle," as used herein, can refer to any moving vehicle that is capable of carrying one or more human occupants and is powered by an internal combustion engine and/or an electronic battery and/or any form of energy that can be recharged at a charging station. The term "vehicle" can include, but is not limited to: cars, trucks, vans, minivans, SUVs, motorcycles, scooters, boats, personal watercraft, and aircraft. The term "vehicle" may include self-driving vehicles, hybrid vehicles, and electrical vehicles.

The term "telematics system," as used herein, can refer to a system that facilitates intercommunication among vehicle systems, communication with the vehicle systems via one or more other systems or devices, etc. In an example, telematics systems can interface with other systems, such as a remote device, other computers, etc., via a wireless communication technology, such as a cellular technology, Bluetooth, etc. using a corresponding modem or transceiver.

The term "vehicle system," as used herein, can refer to an electronically controlled system on a vehicle operable to perform certain actions on components of the vehicle, which can provide an interface to allow operation by another system or graphical user interaction. The vehicle systems can include, but are not limited to, vehicle ignition systems, vehicle conditioning systems (e.g., systems that operate a windshield wiper motor, a windshield washer fluid motor or pump, a defroster motor, heating, ventilating, and air conditioning (HVAC) controls, etc.), vehicle audio systems, vehicle security systems, vehicle video systems, vehicle infotainment systems, vehicle telephone systems, and the like.

In certain implementations, the system for securing an object, such as a piece of luggage in a storage compartment (e.g., trunk), may include a number of securing devices (e.g., pins, pegs, hooks, dividers, walls, blocks, etc.) that may extend through a surface (e.g., a floor or sidewall) of the storage compartment. The system may include one or more detectors (e.g., cameras) that detects the presence of the object on the surface. Upon detecting the object, the system may extend one or more securing devices (e.g., securing devices surrounding the object) to secure the object in place.

For example, the system may identify the luggage shape, size, and position using an interior camera, and may extend pins from the parcel shelf or floor surface in order to surround and secure the luggage. The pins may be any shape (e.g., "walls" instead of pins), and may make up the entire surface or be interspersed throughout the surface. The pins may be actuated by solenoids, electrical motors, or other means. The pins may be rigidly secured once extended (such that they cannot be pressed down towards the starting position once extended), but may also be semi-compliant in the direction of extension.

If a rigid and flat-bottom item is placed on the surface, such as a box, the camera may identify which pins surround the parameter of the item, and those pins may then extend fully to prevent the item from sliding. If a curved or soft item is paced in the surface, the pins may extend at different lengths in order to accommodate the item's curvature. If the user picks up an item and places it in a new location, the system may identify this new location and the extended pins may be adjusted. Using the camera, the system may be able to identify certain things that do not need to be secured, such as a pet.

The system may also be able to identify situations where it would be preferable to preemptively extend the pins to form a storage location before the object is placed such as extending pins to form grocery-bag-sized bins when the user is loading groceries. The system may also use exterior monitoring cameras in addition to the internal camera(s) to help identify these situations as the user approaches the vehicle with grocery bags, for example.

The system may also identify situations were a combination of extending the pins before and after object placement is useful: for example, if a piece of carry-on luggage is about to be loaded, the floor may extend three walls of pins and leave the closest wall un-extended. This may allow the user to easily slide the luggage into the "zone," after which the pins on the $4^{th}$ remaining side could extend, securing the luggage.

Figure 1:
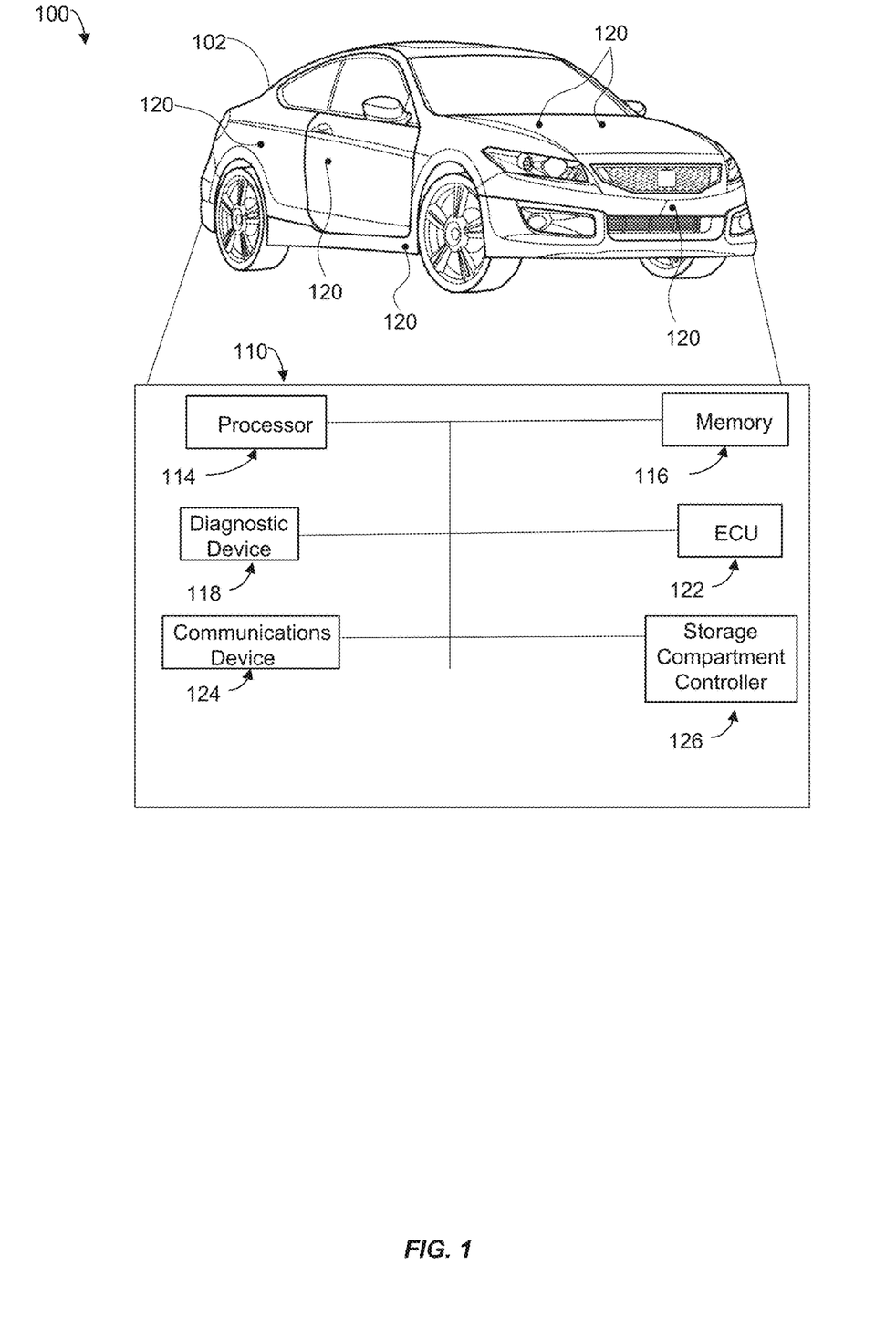
FIG. 1 illustrates an example of an environment for securing an object in a vehicle in accordance with aspects of the present disclosure.

Turning to FIG. 1, a schematic view of a non-limiting example of an operating environment 100 including a vehicle 102 including a system for securing an object. The vehicle 102 may include a vehicle computer system 110 including a processor 114 and a memory 116. The vehicle computer system 110 may reside within the vehicle 102. The vehicle computer system 110 may include a vehicle infotainment system, a vehicle telematics system, or other systems within the vehicle 102. The components of the vehicle computer system 110, as well as the components of other systems, hardware architectures, and software architectures discussed herein, may be combined, omitted or organized into various implementations.

The vehicle 102 may include an internal combustion engine. The vehicle 102 may include an electric motor, which may be powered by rechargeable batteries (not shown) on-board the vehicle 102.

Referring to FIG. 1, the vehicle 102 may generally include an electronic control unit (ECU) 122 that operably controls a plurality of vehicle systems. The vehicle systems may include, but are not limited to, the vehicle computer system 110, among others, including vehicle HVAC systems, vehicle audio systems, vehicle video systems, vehicle infotainment systems, vehicle telephone systems, vehicle control systems, and the like.

The vehicle 102 may further include a communications device 124 (e.g., wireless modem) for providing wired or wireless computer communications utilizing various protocols to send/receive electronic signals internally with respect to features and systems within the vehicle 102 and with respect to external devices. These protocols may include a wireless system utilizing RF communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 124 of the vehicle 102 may be operably connected for internal computer communication via a bus (e.g., a CAN or a LIN protocol bus) to facilitate data input and output between the electronic control unit 122 and vehicle features and systems. In an aspect, the communications device 124 may be configured for vehicle-to-vehicle (V2V) communications. For example, V2V communications may include wireless communications over a reserved frequency spectrum. As another example, V2V communications may include an ad hoc network between vehicles set up using Wi-Fi or Bluetooth®.

In some implementations, the vehicle computer system 110 may include a diagnostic device 118 and one or more sensors 120. The diagnostic device 118 may obtain information from the sensors 120. The sensors 120 may be disposed throughout the vehicle 102, and collect information such as fuel quantity, fuel range, speedometer reading, odometer reading, door locks status, global positioning system (GPS) data, entertainment system data, tire pressure reading, battery reading, fluid level, and other information relevant to the operation of the vehicle 102.

In some examples, the vehicle computer system 110 may include a storage compartment controller 126 that may detect the presence of the object and extend the securing devices to secure the object. The storage compartment controller 126 may include image processing software and/or hardware that may detect the object.

Figure 2:
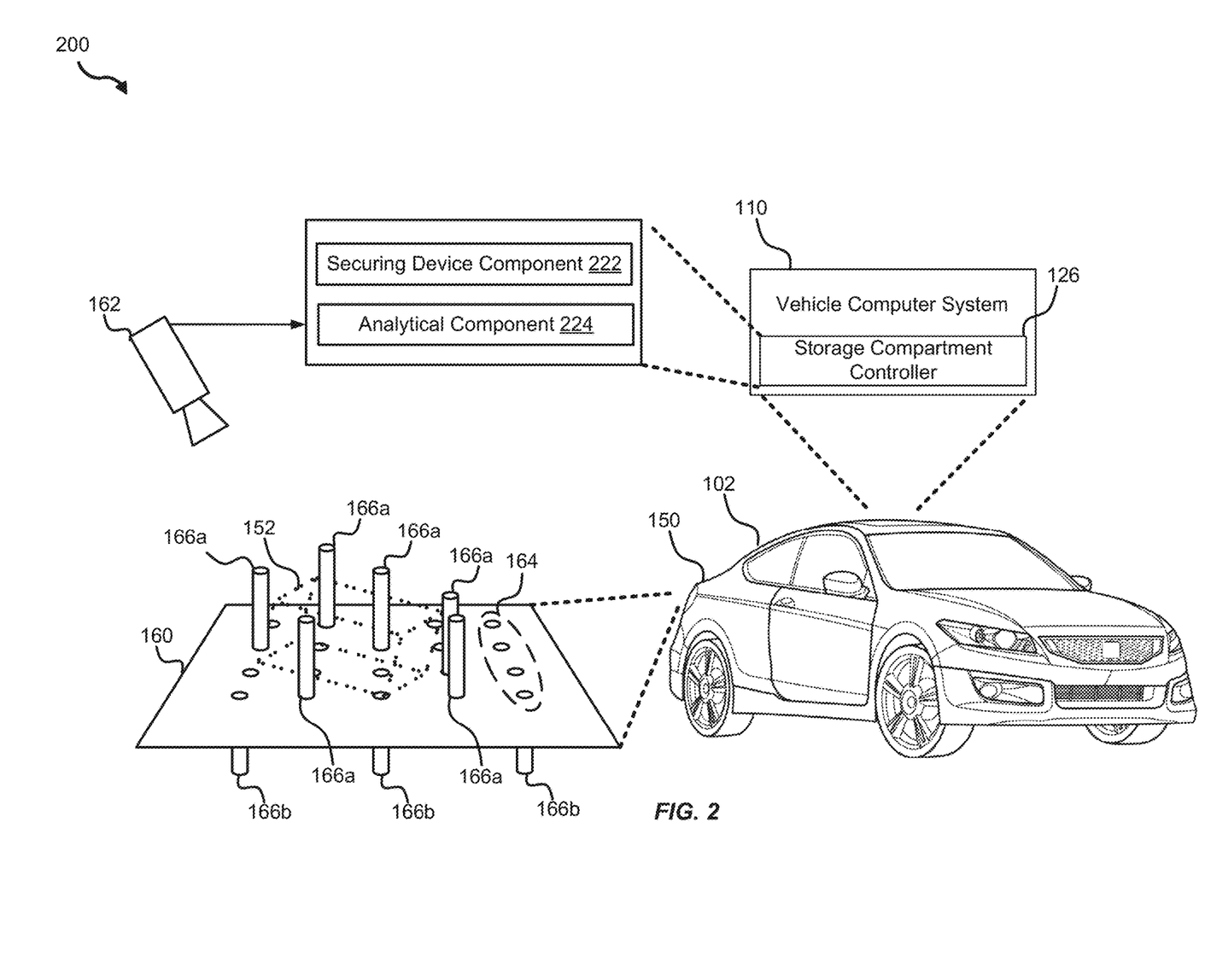
FIG. 2 illustrates an example of a system for securing an object in the vehicle in accordance with aspects of the present disclosure.

Turning now to FIG. 2 in some aspects, therein shown is an example of an environment for securing an object. In some implementations, the vehicle 102 may include the storage compartment controller 126 having a securing device component 222 and an analytical component 224. The vehicle 102 may include a storage compartment 150 having an object 152 (e.g., a piece of luggage, a grocery bag, a golf club bag, etc.) placed on a surface 160 (e.g., a floor or sidewall), a detector 162 (e.g., one or more visible light cameras and/or infrared cameras, RFID sensors, acoustic sensors, electromagnetic sensors, etc.), and securing devices 166 (e.g., pins, pegs, hooks, dividers, walls, blocks, etc.). The securing devices 166 may selectively extend through holes 164 on the surface 160. For examples a first subset 166a of the securing devices 166 may extend through the holes 164 on the surface 160 and a second subset 166b of the securing devices 166 may retract beneath the surface 160. The securing devices 166 may be flexible or rigid. Once extended, the securing devices 166 may be locked in place or pressed back down manually towards the starting point.

In some aspects, the securing devices 166 may be actuated by solenoids, electrical motors, servomechanism motors, piezoelectric actuators, pneumatic actuators, mechanical actuators, electro-mechanical actuators, or other linear actuators.

In some implementations, during normal operations of the vehicle 102, a user may place the object 152 onto the surface 160 of the storage compartment 150. The detector 160 may capture images of the storage compartment 150 and transmit the captured images to the analytical component 224 of the storage compartment controller 126. The analytical component 224 may dynamically determine (based on the captured images) the presence of the object 152. In some examples, the analytical component 224 may determine an edge of the object 152 and/or the region of the storage compartment 150 covered by the object 152. The analytical component 224 may determine another region of the storage compartment 150 not covered by the object 152. Specifically, the analytical component 224 may determine a subset of the securing devices 166 in the region of the storage compartment 150 not covered by the object 152. In some examples, the analytical component 224 may determine that the subset of the securing devices 166 in the region of the storage compartment 150 not covered by the object 152 should be extended to secure the object 152. In one non-limiting example, the analytical component 224 may determine that the securing devices 166a in the region of the storage compartment 150 not covered by the object 152 and near the object 152 may be extended to secure the object 152 and leave room for more objects to be placed on the surface 160 of the storage compartment 150. For example, the securing devices 166a may be the closest securing devices 166 to the object 152 that are not underneath the object 152.

In some examples, some of the securing devices 166 below the object 152 may partially extend through the surface 160 to provide support to the object 152.

In some aspects, the securing device component 222 may extend the securing devices 166a in the region of the storage compartment 150 not covered by the object 152 and near the object 152. In alternative implementations, the securing device component 222 may receive results of the image processing analysis from the analytical component 224 and determine which of the securing devices 166 to extend as describe above.

In some aspects, the user may operate the vehicle 102 without any object on the surface 160 of the storage compartment 150 (not shown in FIG. 2). The detector 162, such as one or more cameras, may capture images of the storage compartment 150. The detector 162 may transmit the captured images to an analytical component 224 of the storage compartment controller 126. The analytical component 224 may perform image processing to determine that there are no objects on the surface 160 of the storage compartment 150. Consequently, a securing device component 222 may retract the securing devices 166 or keep the securing devices 166 retracted beneath the surface 160.

In other aspects of the present disclosure, the detector 162 may include one or more electromagnetic sensors that identify spatial information of the storage compartment 150. The analytical component 224 may analyze the spatial information to determine the presence and/or absence of objects on the surface 160 of the storage compartment 150. Other examples of sensors and analysis techniques to identify the presence and/or absence of objects may also be used.

Figure 3:
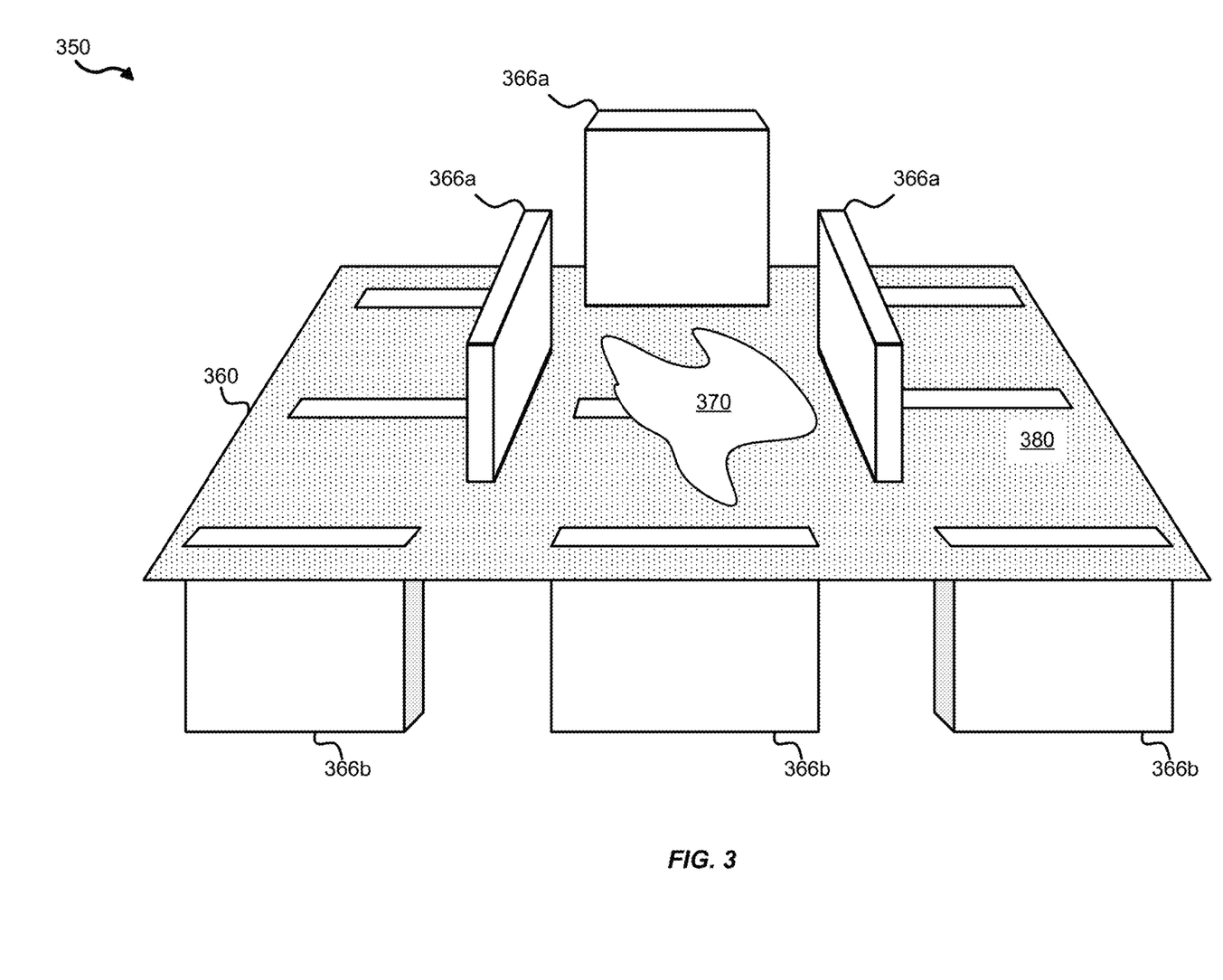
FIG. 3 illustrates another example of a system for securing an object in the vehicle in accordance with aspects of the present disclosure.

Referring to FIG. 3, another example of a storage compartment 300 for securing objects may include a surface 360 and securing devices 366 (e.g., walls or dividers). The securing devices 366 may include extended securing devices 366a and retracted securing devices 366b. An object (not shown) may be placed on the surface 360. The detector 162 may capture the images of the object covering a first region 370 and not a second region 380. Based on the images captured by the detector 162, the analytical component 224 may identify the first region 370 covered by the object and the second region 380 not covered by the object. The securing device component 222 may extend the extended securing devices 366a to secure the object based on the first region and/or the second region identified by the analytical component 224. In one implementation, the securing device component 222 may extend the securing devices 366 in the second region 380 and near the first region 370 (e.g., closest to the first region 370). In another implementation, the securing device component 222 may retract one of the securing devices 366 in the second region 380 and near the first region 370 to allow easy user access to the object. The securing device component 222 may keep some of the securing devices 366 retracted to allow the user to place the object onto the surface 360. The securing device component 222 may extend some of the retracted securing devices 366 after the user places the object onto the surface 360.

Figure 4:
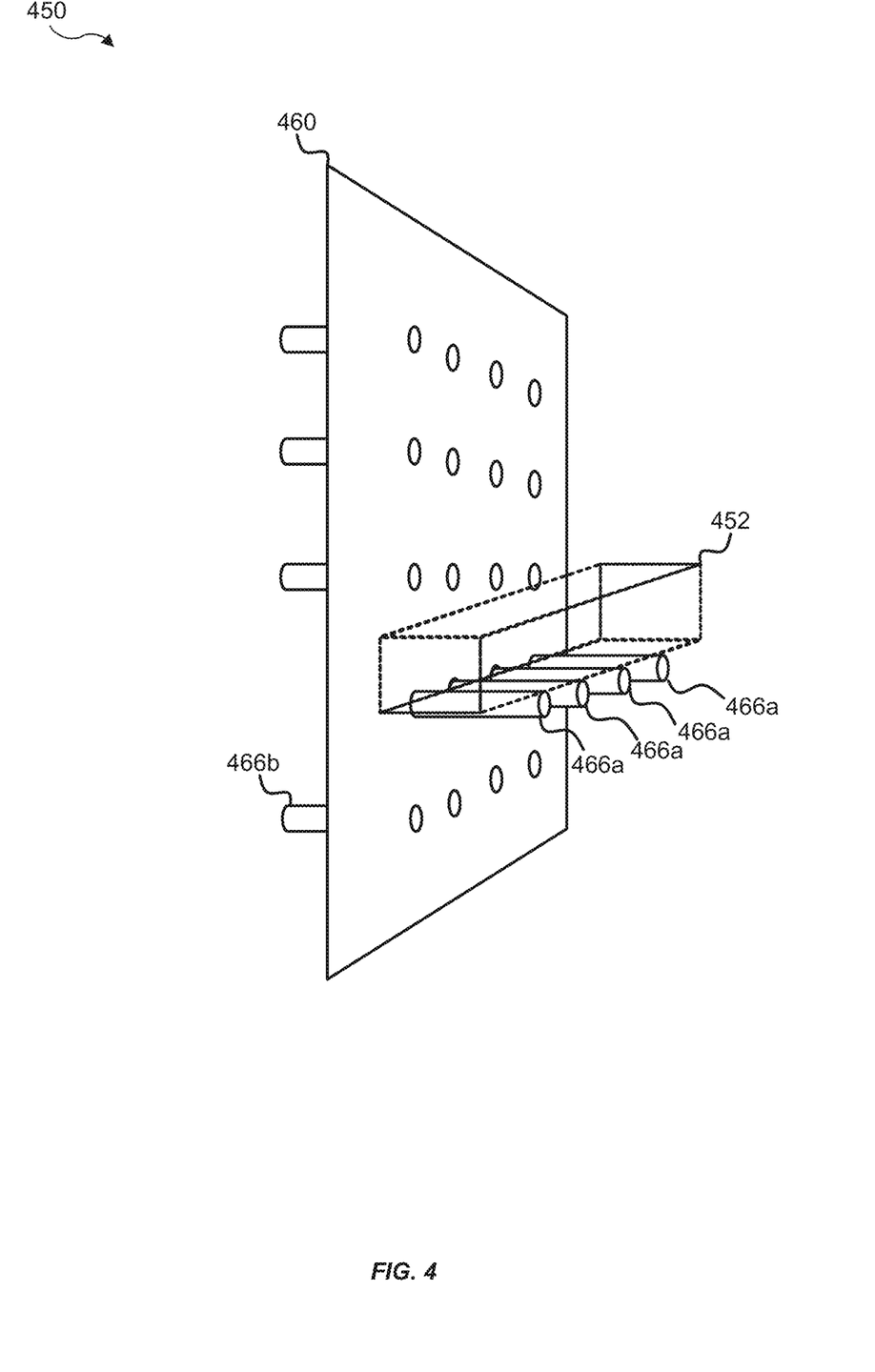
FIG. 4 illustrates an example of a system for securing an object on a sidewall of the vehicle in accordance with aspects of the present disclosure.

Turning now to FIG. 4, an example of a storage compartment 450 for securing objects may include a vertical surface 460 (e.g., a sidewall of the storage compartment 450). The storage compartment 450 may be inside a truck, minivan, van, pickup truck, sports utility vehicle, or a sedan, among other vehicles. The storage compartment 450 may include securing devices 466 (e.g., pins, pegs, walls, dividers, blocks, etc.) such as extended securing devices 466a and retracted securing devices 466b.

In some implementations, the user may place an object 452 against the vertical surface 460 of the storage compartment 450. The detector 160 may capture images of the storage compartment 450 and transmit the captured images to the analytical component 224 of the storage compartment controller 126. The analytical component 224 may determine the presence of the object 452. In some examples, the analytical component 224 may determine an edge of the object 452 and/or the region of the storage compartment 450 covered by the object 452. The analytical component 224 may determine another region of the storage compartment 450 not covered by the object 452. In one non-limiting example, the analytical component 224 may determine that the extended securing devices 466a in the region of the storage compartment 450 not covered by the object 452 and underneath the object 452 may be extended to secure the object 452. In certain examples, the securing device component 222 may extend the extended securing devices 466a and retract the retracted securing devices 466b.

Figure 5:
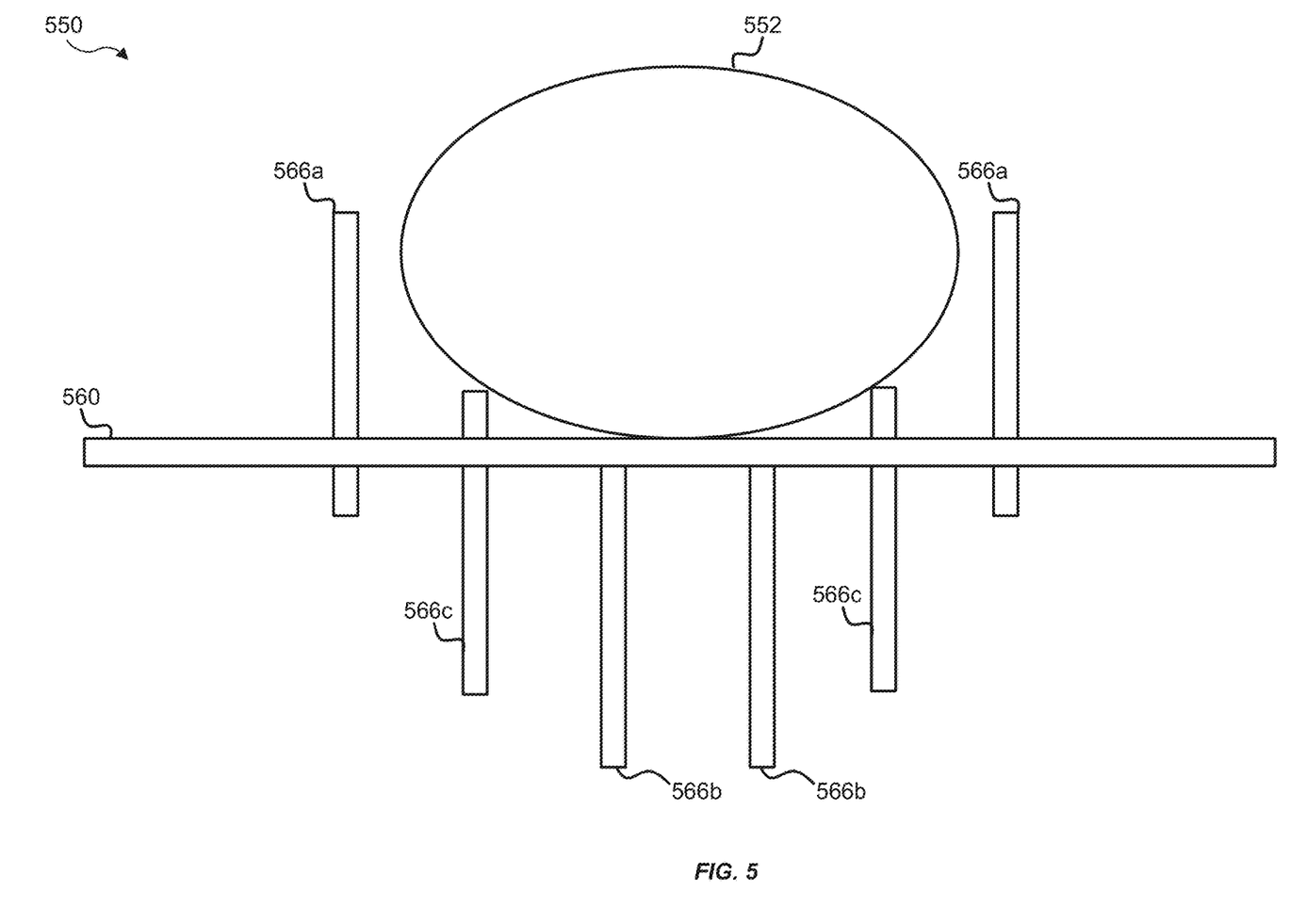
FIG. 5 illustrates yet another example of a system for securing an object in the vehicle in accordance with aspects of the present disclosure.

Turning now to FIG. 5, an example of a storage compartment 550 for securing objects may include a surface 560. The storage compartment 450 may include securing devices 566 (e.g., pins, pegs, hooks, walls, dividers, blocks, etc.) such as extended securing devices 566a, retracted securing devices 566b, and partially extended securing devices 566c.

In some implementations, the user may place an object 552 on the surface 560 of the storage compartment 550. The detector 160 may capture images of the storage compartment 550 and transmit the captured images to the analytical component 224 of the storage compartment controller 126. The analytical component 224 may determine the presence of the object 552. In some examples, the analytical component 224 may determine an edge of the object 552 and/or the region of the storage compartment 550 covered by the object 552. The analytical component 224 may determine another region of the storage compartment 550 not covered by the object 552. In one non-limiting example, the analytical component 224 may determine that the extended securing devices 566a in the region of the storage compartment 550 not covered by the object 552 may be extended to secure the object 552. The analytical component 224 may determine that the partially extended securing devices 566c covered by the object 552 may also be extended to secure the object 552. In certain examples, the securing device component 222 may extend the extended securing devices 566a, partially extend the partially extended securing devices 566c, and retract the retracted securing devices 566b.

Figure 6:
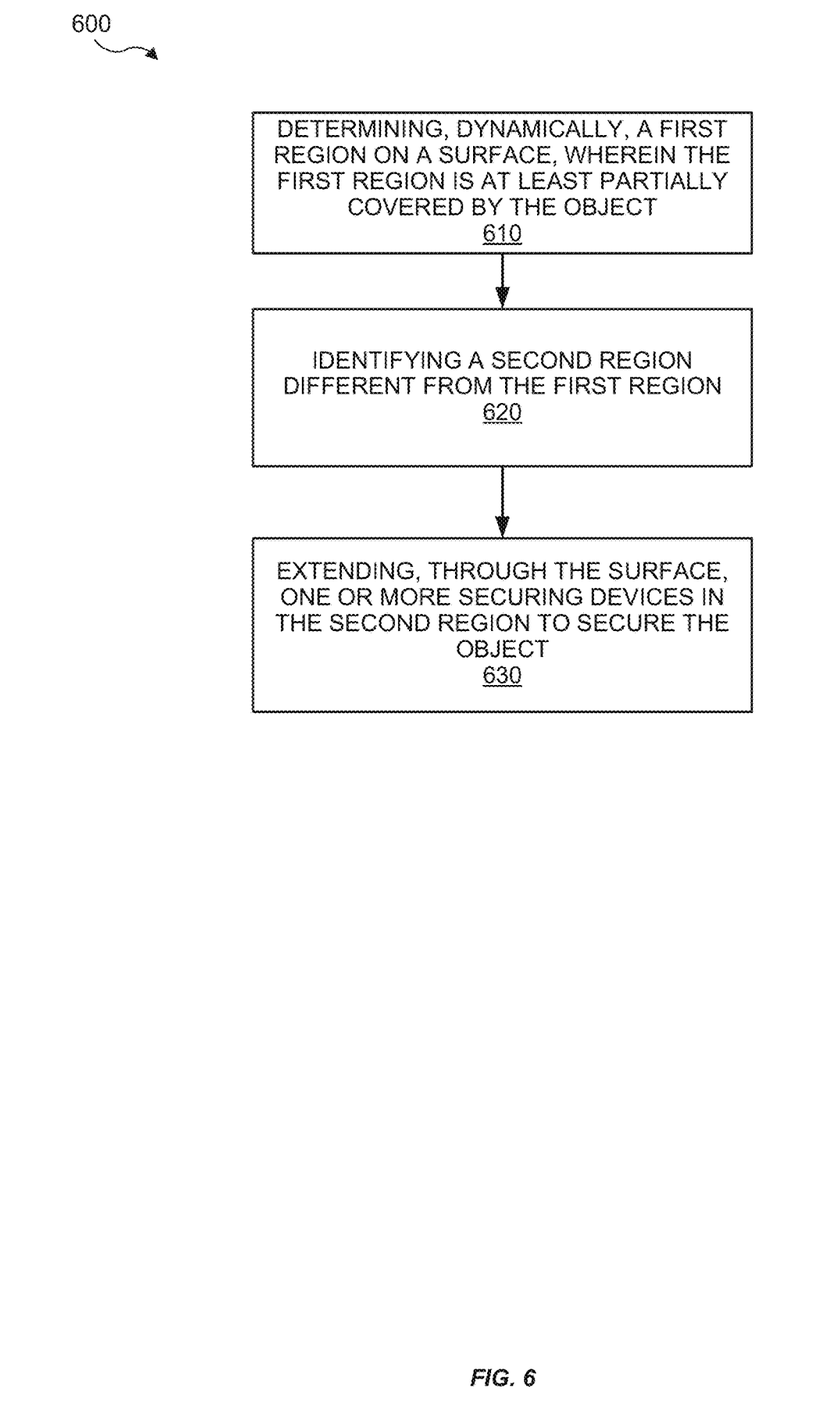
FIG. 6 illustrates an example of a method for securing an object in the vehicle in accordance with aspects of the present disclosure.

Turning now to FIG. 6, a method 600 for securing an object may be performed by the storage compartment controller 126.

At block 610, the method 600 may determine, dynamically, a first region on a surface, wherein the first region is at least partially covered by the object. For example, the analytical component 224 may dynamically determine a first region on the surface 160, wherein the first region is at least partially covered by the object 152.

At block 620, the method 600 may identify a second region different from the first region. For example, the analytical component 224 may identify a second region different from the first region. The second region may be the portion of the surface 162 that is not covered by the object 152.

At block 630, the method 600 may extend, through the surface, one or more securing devices in the second region to secure the object. For example, the securing device component 222 may extend one or more of the securing devices 166, such as the first set 166a of the securing devices 166, through the surface 160 to secure the object 152. In some implementations, the securing device component 222 may send signals to solenoids, electrical motors, servo-mechanism motors, piezoelectric actuators, pneumatic actuators, mechanical actuators, electro-mechanical actuators, or other linear actuators actuating the securing devices 166 to extend the first set 166a of the securing devices 166.

Figure 7:
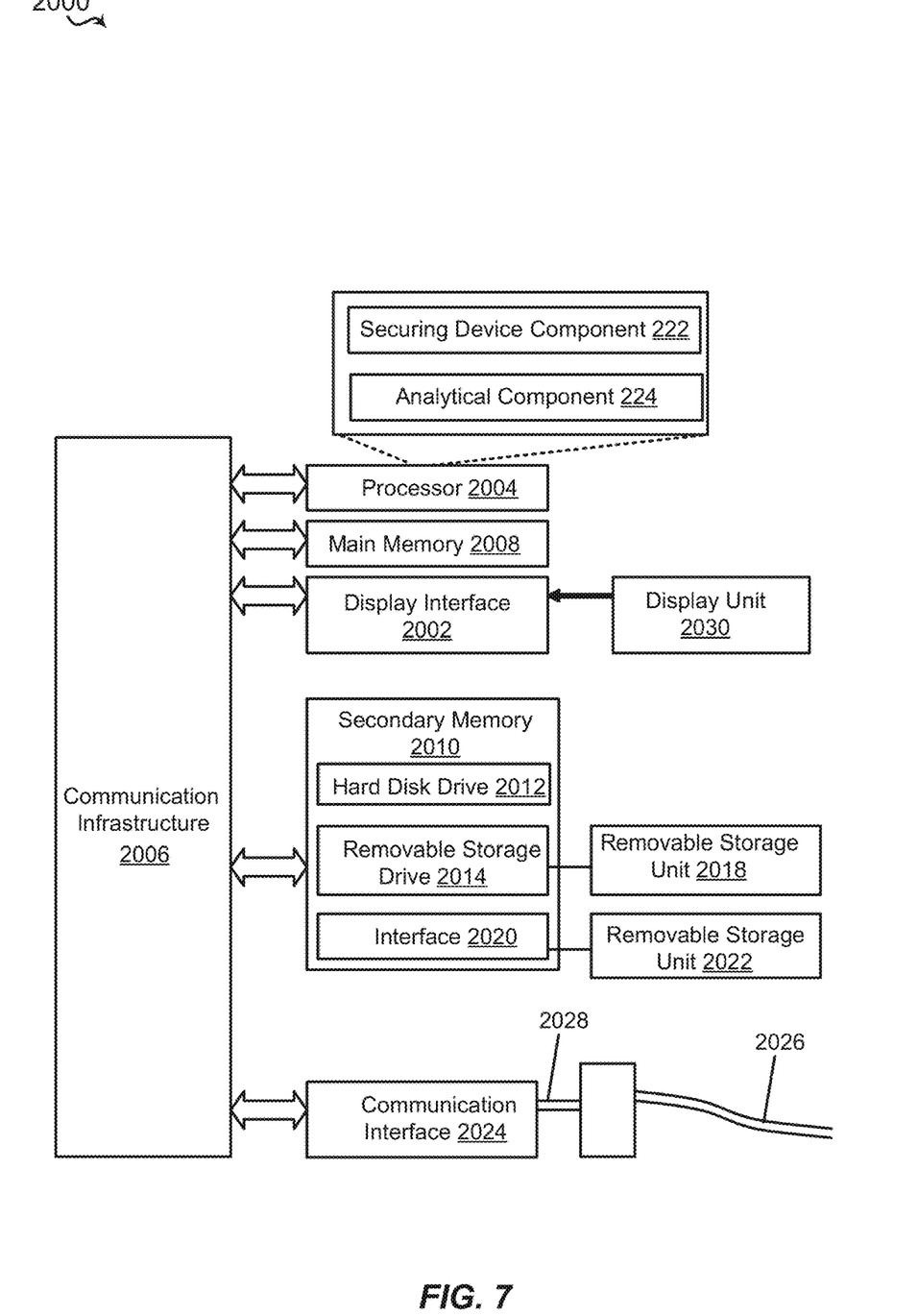
FIG. 7 illustrates an example of a computer system in accordance with aspects of the present disclosure.

Aspects of the present disclosures may be implemented using hardware, software, or a combination thereof and may be implemented in one or more computer systems or other processing systems. In an aspect of the present disclosures, features are directed toward one or more computer systems capable of carrying out the functionality described herein. An example of such the computer system 2000 is shown in FIG. 7.

The computer system 2000 includes one or more processors, such as processor 2004. The processor 2004 is connected to a communication infrastructure 2006 (e.g., a communications bus, cross-over bar, or network). Various software aspects are described in terms of this example computer system. After reading this description, it will become apparent to a person skilled in the relevant art(s) how to implement aspects of the disclosures using other computer systems and/or architectures.

The computer system 2000 may include a display interface 2002 that forwards graphics, text, and other data from the communication infrastructure 2006 (or from a frame buffer not shown) for display on a display unit 2030. Computer system 2000 also includes a main memory 2008, preferably random access memory (RAM), and may also include a secondary memory 2010. The secondary memory 2010 may include, for example, a hard disk drive 2012, and/or a removable storage drive 2014, representing a floppy disk drive, a magnetic tape drive, an optical disk drive, a universal serial bus (USB) flash drive, etc. The removable storage drive 2014 reads from and/or writes to a removable storage unit 2018 in a well-known manner. Removable storage unit 2018 represents a floppy disk, magnetic tape, optical disk, USB flash drive etc., which is read by and written to removable storage drive 2014. As will be appreciated, the removable storage unit 2018 includes a computer usable storage medium having stored therein computer software and/or data.

Alternative aspects of the present disclosures may include secondary memory 2010 and may include other similar devices for allowing computer programs or other instructions to be loaded into computer system 2000. Such devices may include, for example, a removable storage unit 2022 and an interface 2020. Examples of such may include a program cartridge and cartridge interface (such as that found in video game devices), a removable memory chip (such as an erasable programmable read only memory (EPROM), or programmable read only memory (PROM)) and associated socket, and other removable storage units 2022 and interfaces 2020, which allow software and data to be transferred from the removable storage unit 2022 to computer system 2000.

Computer system 2000 may also include a communications interface 2024. Communications interface 2024 allows software and data to be transferred between computer system 2000 and external devices. Examples of communications interface 2024 may include a modem, a network interface (such as an Ethernet card), a communications port, a Personal Computer Memory Card International Association (PCMCIA) slot and card, etc. Software and data transferred via communications interface 2024 are in the form of signals 2028, which may be electronic, electromagnetic, optical or other signals capable of being received by communications interface 2024. These signals 2028 are provided to communications interface 2024 via a communications path (e.g., channel) 2026. This path 2026 carries signals 2028 and may be implemented using wire or cable, fiber optics, a telephone line, a cellular link, an RF link and/or other communications channels. In this document, the terms "computer program medium" and "computer usable medium" are used to refer generally to media such as a removable storage drive 2018, a hard disk installed in hard disk drive 2012, and signals 2028. These computer program products provide software to the computer system 2000. Aspects of the present disclosures are directed to such computer program products.

Computer programs (also referred to as computer control logic) are stored in main memory 2008 and/or secondary memory 2010. Computer programs may also be received via communications interface 2024. Such computer programs, when executed, enable the computer system 2000 to perform the features in accordance with aspects of the present disclosures, as discussed herein. In particular, the computer programs, when executed, enable the processor 2004 to perform the features in accordance with aspects of the present disclosures. Accordingly, such computer programs represent controllers of the computer system 2000.

In an aspect of the present disclosures where the method is implemented using software, the software may be stored in a computer program product and loaded into computer system 2000 using removable storage drive 2014, hard drive 2012, or communications interface 2020. The control logic (software), when executed by the processor 2004, causes the processor 2004 to perform the functions described herein. In another aspect of the present disclosures, the system is implemented primarily in hardware using, for example, hardware components, such as application specific integrated circuits (ASICs). Implementation of the hardware state machine so as to perform the functions described herein will be apparent to persons skilled in the relevant art(s).

Figure 8:
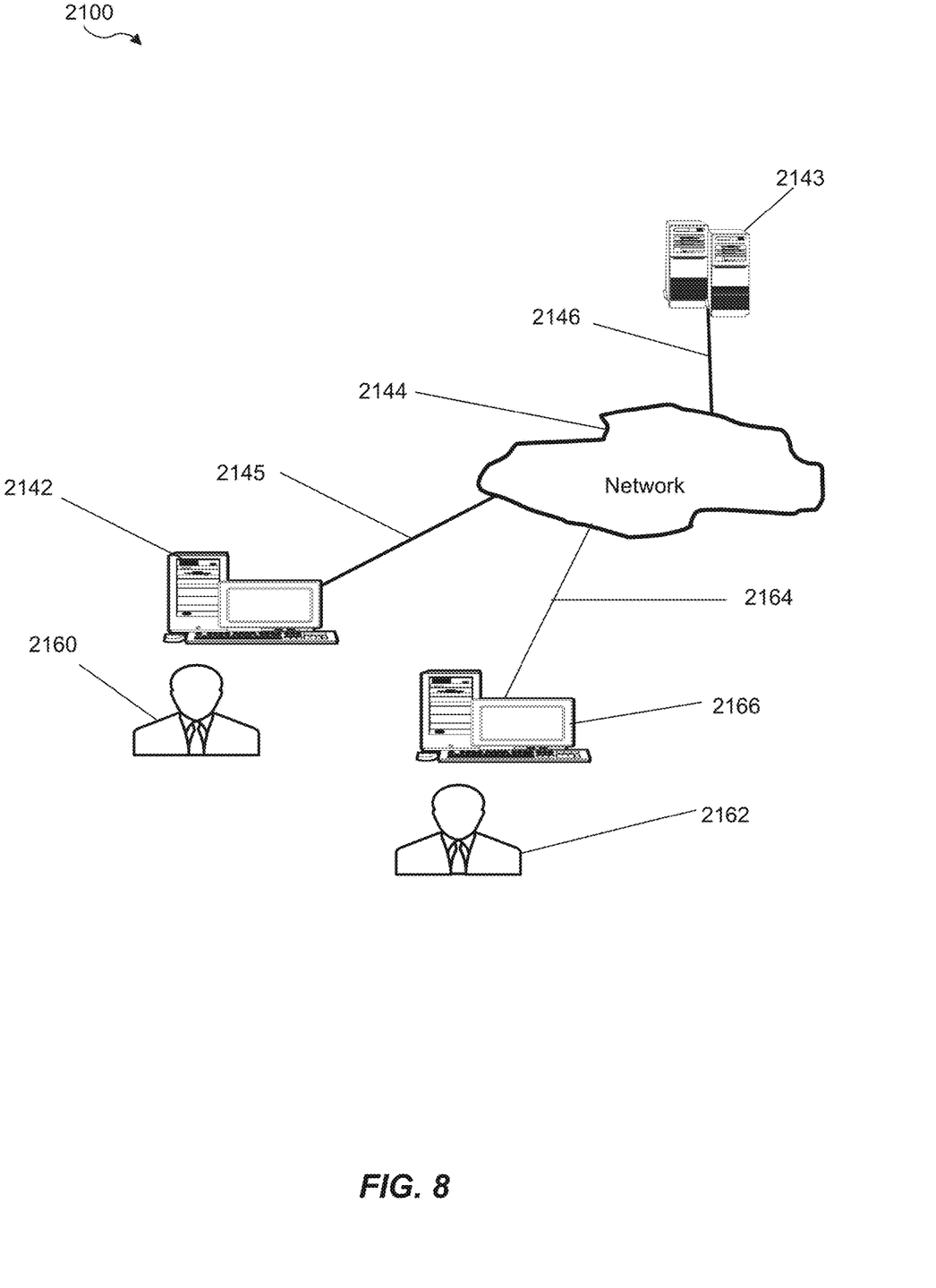
FIG. 8 illustrates a block diagram of various exemplary system components in accordance with aspects of the present disclosure.

FIG. 8 is a block diagram of various example system components, in accordance with an aspect of the present disclosure. FIG. 8 shows a communication system 2100 usable in accordance with the present disclosure. The communication system 2100 includes one or more accessors 2160, 2162 (also referred to interchangeably herein as one or more "users") and one or more terminals 2142, 2166. In one aspect, data for use in accordance with aspects of the present disclosure is, for example, input and/or accessed by accessors 2160, 2162 via terminals 2142, 2166, such as personal computers (PCs), minicomputers, mainframe computers, microcomputers, telephonic devices, or wireless devices, such as personal digital assistants ("PDAs") or a hand-held wireless devices coupled to a server 2143, such as a PC, minicomputer, mainframe computer, microcomputer, or other device having a processor and a repository for data and/or connection to a repository for data, via, for example, a network 2144, such as the Internet or an intranet, and couplings 2145, 2146, 2164. The couplings 2145, 2146, 2164 include, for example, wired, wireless, or fiberoptic links. In another example variation, the method and system in accordance with aspects of the present disclosure operate in a stand-alone environment, such as on a single terminal.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of securing an object, comprising:
   determining, dynamically, a first region on a surface, wherein the first region is at least partially covered by the object;
   identifying a second region different from the first region; and
   extending, through the surface, one or more securing devices in the second region to secure the object based on one or more of determining the first region and identifying the second region.

2. The method of claim 1, wherein identifying the second region further comprises identifying a neighboring region surrounding the first region.

3. The method of claim 1, wherein identifying the second region further comprises identifying a lower region such that the object lies on portions of the one or more securing devices extended in the lower region.

4. The method of claim 1, wherein determining the first region further comprises optically detecting the object covering the first region.

5. The method of claim 1, wherein the one or more securing devices include a pin, a wall, a divider, or a block.

6. The method of claim 1, wherein extending the one or more securing devices further comprises fully extending a first subset of the one or more securing devices and partially extending a second subset of the one or more securing devices.

7. The method of claim 1, further comprises, prior to determining the first region, extending a second set of securing devices near a portion of a circumference of the object; and
   wherein, after the object is placed in the first region, extending the one or more securing devices further comprises extending the one or more securing devices near a remaining portion of the circumference of the object.

8. A vehicle, comprising:
   a storage compartment including a surface and one or more securing devices configured to extend through the surface;
   one or more detectors configured to detect an object on the surface of the storage compartment; and
   a controller including:
      a memory,
      one or more processors operatively connected to the memory, the one or more processors being configured to:
         determine, dynamically, a first region on the surface, wherein the first region is at least partially covered by the object;

identify a second region different from the first region; and cause the one or more securing devices in the second region to extend to secure the object based on one or more of determining the first region and identifying the second region.

9. The vehicle of claim 8, wherein identifying the second region further comprises identifying a neighboring region surrounding the first region.

10. The vehicle of claim 8, wherein identifying the second region further comprises identifying a lower region such that the object lies on portions of the one or more securing devices extended in the lower region.

11. The vehicle of claim 8, wherein determining the first region further comprises optically detecting the object covering the first region via the one or more detectors.

12. The vehicle of claim 8, wherein the one or more securing devices include at least a pin, a wall, a divider, or a block.

13. The vehicle of claim 8, wherein causing the one or more securing devices to extend further comprises causing a first subset of the one or more securing devices to fully extend and a second subset of the one or more securing devices to partially extend.

14. The vehicle of claim 8, wherein the one or more processors are further configured to, prior to determining the first region, cause a second set of securing devices near a portion of a circumference of the object to extend; and wherein, after the object is placed in the first region, causing the one or more securing devices to extend further comprises causing the one or more securing devices to extend near a remaining portion of the circumference of the object.

15. A non-transitory computer readable medium having instructions stored therein that, when executed by one or more processors of a controller, cause the one or more processors to:

determine, dynamically, a first region on the surface, wherein the first region is at least partially covered by an object;

identify a second region different from the first region; and cause one or more securing devices in the second region to extend to secure the object based on one or more of determining the first region and identifying the second region.

16. The non-transitory computer readable medium of claim 15, wherein the instructions for identifying the second region further comprises instructions that, when executed by the one or more processors, cause the one or more processors to identify a neighboring region surrounding the first region.

17. The non-transitory computer readable medium of claim 15, wherein the instructions for identifying the second region further comprises instructions that, when executed by the one or more processors, cause the one or more processors to identify a lower region such that the object lies on portions of the one or more securing devices extended in the lower region.

18. The non-transitory computer readable medium of claim 15, wherein the one or more securing devices include at least a pin, a wall, a divider, or a block.

19. The non-transitory computer readable medium of claim 15, wherein the instructions for causing the one or more securing devices to extend further comprises instructions that, when executed by the one or more processors, cause the one or more processors to cause a first subset of the one or more securing devices to fully extend and a second subset of the one or more securing devices to partially extend.

20. The vehicle of claim 8, further comprises instructions that, when executed by the one or more processors, cause the one or more processors to cause, prior to determining the first region, a second set of securing devices near a portion of a circumference of the object to extend; and wherein, after the object is placed in the first region, the instructions for causing the one or more securing devices to extend further comprises instructions that, when executed by the one or more processors, cause the one or more processors to cause the one or more securing devices to extend near a remaining portion of the circumference of the object.

21. The method of claim 1, wherein:

the one or more securing devices is a subset of a plurality of securing devices;

each of the plurality of securing devices has an extended position and a retracted position; and the plurality of securing devices are in the retracted positions when not securing an object.

22. The method of claim 1, wherein extending the one or more securing devices includes electromechanically extending the one or more securing devices.

* * * * *